US007012395B2

(12) United States Patent
Haunerdinger et al.

(10) Patent No.: US 7,012,395 B2
(45) Date of Patent: Mar. 14, 2006

(54) METHOD FOR CONTINUOUS-PATH CONTROL

(75) Inventors: Josef Haunerdinger, Vachendorf (DE); Johann Zacek, Evenhausen (DE); Anton Brader, Obing (DE); Michael Rauth, Traunreut (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 78 days.

(21) Appl. No.: 10/491,685

(22) PCT Filed: Sep. 12, 2002

(86) PCT No.: PCT/EP02/10227

§ 371 (c)(1),
(2), (4) Date: Oct. 4, 2004

(87) PCT Pub. No.: WO03/032098

PCT Pub. Date: Apr. 17, 2003

(65) Prior Publication Data

US 2005/0035734 A1    Feb. 17, 2005

(30) Foreign Application Priority Data

Oct. 4, 2001    (DE) ................................. 101 49 175

(51) Int. Cl.
*G05B 19/25* (2006.01)

(52) U.S. Cl. .................. 318/573; 318/572; 318/568.15
(58) Field of Classification Search ................. 318/573, 318/572, 568.15, 568.11, 568.12, 568.22, 318/568.17, 632, 568.19, 567, 569, 570, 318/575; 395/80; 364/474.28
See application file for complete search history.

(56) References Cited

U.S. PATENT DOCUMENTS

| 4,750,965 | A | * | 6/1988 | Pippel et al. ................ 156/361 |
| 5,216,222 | A | | 6/1993 | Masuda |
| 5,371,452 | A | | 12/1994 | Kato |
| 5,394,513 | A | | 2/1995 | Sgarbi et al. |
| 5,434,489 | A | | 7/1995 | Cheng et al. |
| 5,475,602 | A | | 12/1995 | Otsuki et al. |
| 5,545,959 | A | | 8/1996 | Otsuki et al. |

(Continued)

FOREIGN PATENT DOCUMENTS

EP    0 480 046    4/1992

(Continued)

OTHER PUBLICATIONS

2000' Catalog NUM 1020/1040/1050/1060 CNCs NUM Drive Drives and Motors, Jul. 31, 2000, XP002263030, pp. 4.5 to 4.6, 4.15, found on Internet at http://www.num.fr/us/cat/cat2000gb.pdf on Nov. 27, 2003.

(Continued)

*Primary Examiner*—Karen Masih
(74) *Attorney, Agent, or Firm*—Kenyon & Kenyon

(57) ABSTRACT

In a method for continuous-path control in at least two linear axes and at least one angle axis, the movement of a tool relative to a workpiece is predefined by a parts program for a numerical control. The velocity control in the numerical control is performed separately for the linear axes and the angle axes. Deviations in the movement between the tool and the workpiece resulting due to the separate velocity control may be corrected by compensation movements of the linear axes. The separate velocity control for the linear axes and the angle axes may be achieved by rounding the velocity profiles in the angle axes more significantly than the velocity profiles in the linear axes. A measure for the rounding for velocity profiles may be predefined separately for the angle axes and the linear axes.

10 Claims, 2 Drawing Sheets

U.S. PATENT DOCUMENTS 6,084,374 A    7/2000  Nakatsuka et al.
2004/0181307 A1 *   9/2004  Hirai et al. .................. 700/194

FOREIGN PATENT DOCUMENTS

EP    0 864 952    9/1998

OTHER PUBLICATIONS

"Definition of a Time Constant," Technum—The Technical Journal of CNCs and Drives, Nr. 2, Dec. 31, 1996, p. 13, XP002263031, ISSN 12702730, found on Internet at http://www.num.it/download/biblio/tech2gb.pdf on Nov. 27, 2003.

* cited by examiner

METHOD FOR CONTINUOUS-PATH CONTROL

FIELD OF THE INVENTION

The present invention relates to a method for continuous-path control.

BACKGROUND INFORMATION

Numerical controls are used in modern machine tools to control the positioning and movement of tools relative to a workpiece. To machine a workpiece in accordance with a setpoint selection, it may be necessary to move the tool relative to the workpiece on paths established beforehand. Therefore, one also speaks of a continuous-path control. The desired paths are determined in a parts program that is executed by the numerical control. In so doing, the numerical control converts the geometrical statements of the parts program into statements for the positional control of the different axes of the machine tool.

In such a parts program, for example, any tool paths as needed are approximated by interpolation points (also known as support points), between which the continuous-path control linearly interpolates. In modern machine tools such as a 5-axis milling machine, a plurality of axes of motion are available, upon which the desired path may be projected. The stipulation for each axis of motion is then in turn made up of interpolation points (axial positions), which are approached in succession and in synchronism by each axis. This holds true both for linear axes and for angle axes.

Since a machine tool is subject to certain restrictions with respect to the maximum acceleration and also the maximum jerk (change of acceleration) in its axes of motion, it is not possible to pass through a corner, provided in the parts program, between two segments of the tool path with a finite velocity exactly, since to that end, an infinite acceleration would be necessary. Therefore, the maximum velocity with which a corner may be traversed is a function of the maximum permissible tolerance with which the actual tool path is allowed to deviate from the ideal tool path. The greater this tolerance, the higher the possible velocity. In this context, as velocity increases, a corner established in the parts program is increasingly rounded.

Similar restrictions are also true in the execution of a single path segment, for which each axis must be moved from a starting point (projection of the first interpolation point) to an end point (projection of the second interpolation point). Usually a velocity is predefined for this movement. Since, however, a sudden change in velocity at the starting point of a path segment would be associated with infinite acceleration, the velocity profile must be rounded. This rounding may be effected by filtering the velocity profile using FIR filters, as is described, for example, in European Published Patent Application No. 0 864 952. Since each path is made up of the superimposition of all axial movements, the individual path segments must be filtered such that all sudden changes in the velocity are smoothed in the same manner. Only in this manner is a synchronous velocity control or acceleration control ensured for each axis, resulting in adherence to the predefined tool path.

A disadvantage in the method of continuous-path control described is that, in machine tools having a plurality of axes, in each case the axes having the poorest dynamics (thus, for example, the lowest maximum acceleration) predefine the velocity control. Axes which are more dynamic must wait for the slowest axis involved in a path segment. Such less dynamic axes are often the angle axes of a machine tool. Moreover, in the case of a limitation by an angle axis, it itself is operated at the limit. This results in impairment of the surface quality of the machined workpiece, since in this case, the angle axis fully utilizes the path deviation allowed to it.

Therefore, an exemplary embodiment of the present invention may indicate a method for continuous-path control which supplies improved surface quality of the machined workpiece, and/or may allow shorter machining times.

SUMMARY

The setting of an angle axis to the position of a tool relative to a workpiece mounted on a machine tool may play no role when a tool-position correction present in many modern machine tools is activated. This tool-position correction, also known as RTCP (rotating tool center point) unit, may ensure that, in response to a movement in an angle axis, the linear axes are controlled such that the engagement point of the tool on the workpiece may be retained.

According to an exemplary embodiment of the present invention, a separate velocity control may be performed for angle axes and linear axes. For example, this is achieved by using softer filters for the rounding of the velocity profiles of the angle axes than for the rounding of the velocity profiles of the linear axes. Smaller accelerations (and higher derivatives of the velocity profiles) thereby occur in the angle axes, the deviations in the closed-loop control circuit of the angle axes become smaller, which means the surface quality of the machined workpiece may increase. To nevertheless maintain the necessary path fidelity, the RTCP unit must control a compensation movement in the linear axes such that the engagement point of the tool on the workpiece does not change compared to a synchronous velocity control. Given suitable parameterization, the effect of the improved surface quality may be shifted totally or partially in favor of a higher machining velocity.

DETAILED DESCRIPTION

Figure 1:
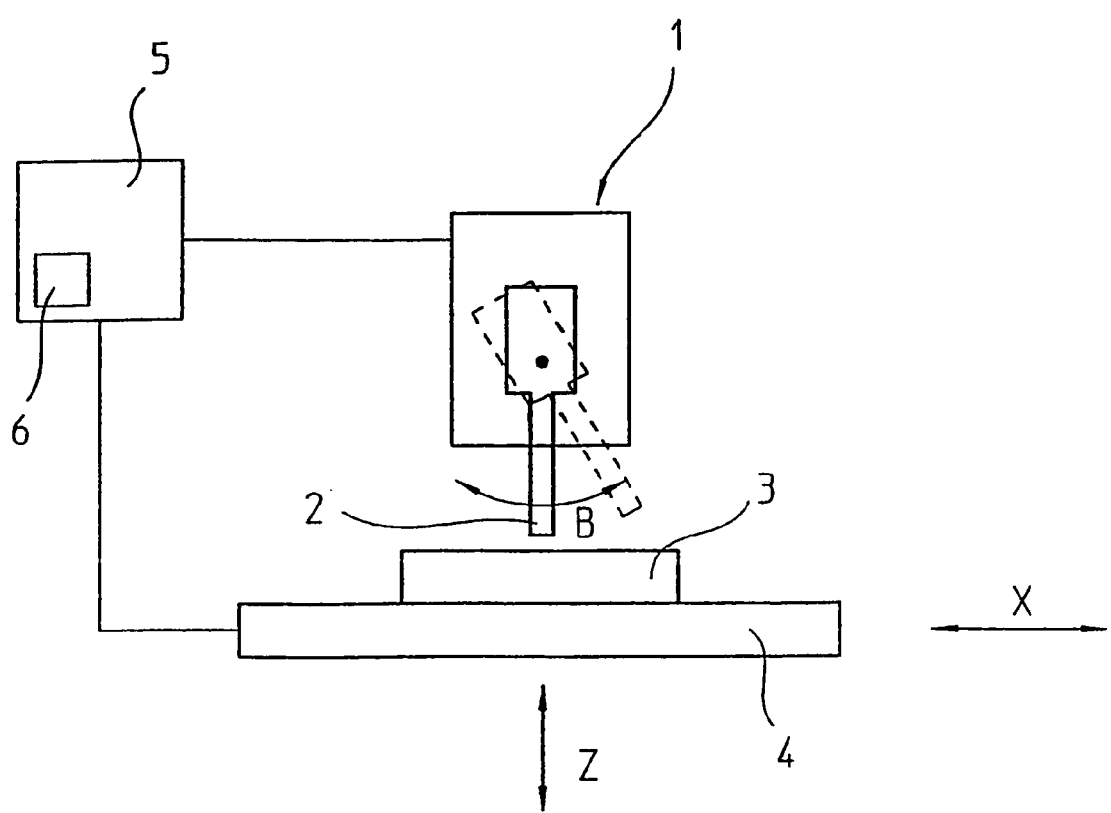
FIG. 1 shows a machine tool having numerical control.

FIG. 1 shows a machine tool 1 having a tool 2. A workpiece 3 is mounted on a machining table 4. Workpiece 3 and tool 2 are movable relative to each other in several axes. Thus, linear axes in the X-direction and Z-direction are shown in the drawing; a third linear axis in the Y-direction is normal to the drawing plane. In a 5-axis milling machine, there are also two angle axes, of which the B-axis is shown in FIG. 1. Tool 2 is able to swivel about the direction of the Y-axis. A second angle axis A is obtained when machining table 4 is able to be tilted about the X-axis. Axes X, Y, Z, A, B are controlled by a numerical control 5 which, for example, is able to execute a parts program or receive and carry out individual commands by the machine-tool operator.

FIG. 1 illustrates that a movement of tool 2 about angle axis B causes the tip of tool 2 to shift with respect to workpiece 3. To simplify the programming of the machining of a workpiece in a plurality of axes X, Y, Z, A, B having at least one angle axis A, B, the programmer may only have to predefine the desired path for the tip of tool 2 and the tool direction. The setpoint positions of angle axes A, B may then be calculated automatically. An RTCP unit 6 of numerical control 5 may ensure that, in response to a movement in an angle axis A, B, linear axes X, Y, Z are controlled so that the engagement point of tool 2 on workpiece 3 is retained on the predefined path. Only the direction of tool 2 relative to workpiece 3 changes. At least two linear axes X, Z may be necessary to correct the engagement point in response to the movement about an angle axis B. Therefore, an exemplary embodiment of the present invention may be employed on machine tools having at least one angle axis A, B and at least two linear axes X, Y, Z.

Figure 2A:
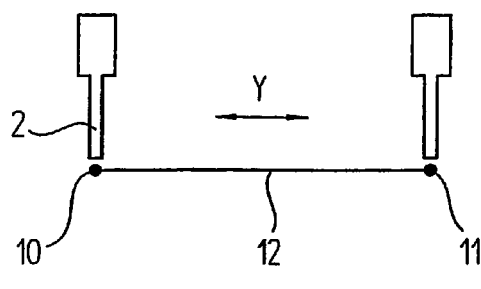
FIGS. 2a and 2b show a tool path in two views.
Figure 2B:
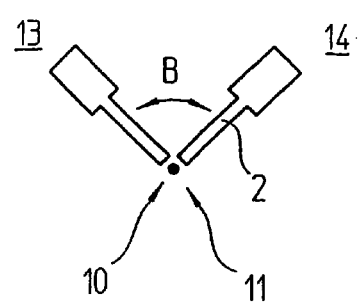

With reference to FIGS. 2a and 2b, an example is shown for a movement, predefined in a parts program for a numerical control 5, between tool 2 and workpiece 3 in two axes Y and B. The programmer (or an interpolator in numerical control 5 which, by interpolation points, may approximate a path predefined by the programmer) stipulates a starting point 10 and an end point 11, between which tool 2 is intended to machine a path segment 12 with a preset velocity with respect to the Y axis. At the same time, a change in the tool direction is predefined. From a starting position 13, the tool swivels about angle axis B into an end position 14. In this context, starting position 13 exists at starting point 10 at point of time T1, and end position 14 exists at end point 11 at point of time T2. Since the tip of tool 2 moves, for example, in the Z axis during the swivel from position 13 to position 14, machining table 4 executes a corresponding compensation movement in linear axis Z. In a similar manner, a compensation movement of linear axis X may be necessary. This is accomplished by RTCP unit 6 in numerical control 5. Therefore, in FIG. 2b, angle axis B is shown shifted to the tool tip.

Figure 3A:
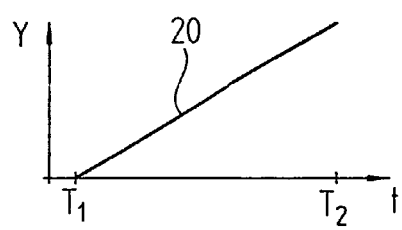
FIGS. 3a and 3b show a position profile for two axes.
Figure 3B:
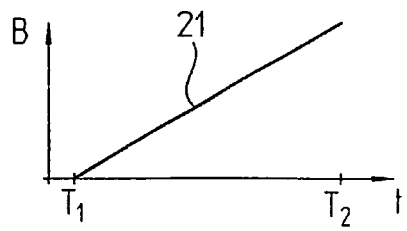

FIG. 3a shows linear movement 20 specified by the programmer in the X axis. Between starting point 10 and end point 11, a linear interpolation is carried out which initially corresponds to a movement with constant velocity, as represented by a dotted line in FIG. 4a. Analogously, FIG. 3b shows angular movement 21 predefined by the programmer in the B axis: between starting position 13 and end position 14, a linear interpolation is carried out which initially corresponds to a rotation with constant velocity, as shown by a dotted line in FIG. 4b. A tool path may be programmed to avoid such sudden changes in the velocity.

Figure 4A:
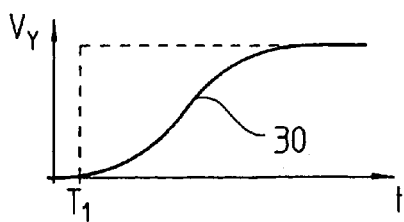
FIGS. 4a and 4b show a velocity profile for two axes.
Figure 4B:
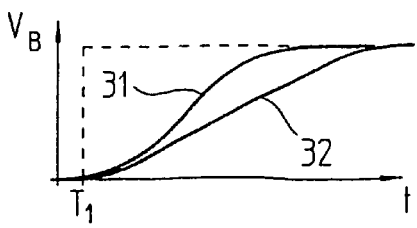

Since, however, a sudden change in the velocity or angular velocity, as shown in FIGS. 4a and 4b, respectively, may not be possible (since the maximum acceleration may be limited for each axis), the velocity profile in FIGS. 4a and 4b may be rounded such that non-continuously differentiable regions (i.e., sudden changes and/or kinks) may no longer occur. For instance, this may be accomplished with the aid of filters as described in European Published Patent Application No. 0 864 952. If one gives the sudden change in the velocity for each of the axes through such a filter, a stipulation is obtained for filtered linear movement 30 and filtered angular movement 31, respectively. In this context, care may be conventionally taken to round the velocity profiles for all axes X, Y, Z, A, B to the same degree in order to obtain a synchronous movement of all axes. This may also be described as synchronous velocity control for all axes. The result may be that the velocity profile always had to be rounded so that the axis having the smallest maximum acceleration (or also that having the smallest maximum jerk) was not overloaded. Therefore, advantage may not be taken of the dynamics of the remaining axes.

However, since it may usually be the angle axes A, B which are less dynamic than linear axes X, Y, Z, it is proposed, instead of the synchronous velocity control for all axes X, Y, Z, A, B, to use a separate velocity control for angle axes A, B and linear axes X, Y, Z. In an exemplary embodiment of the present invention, sudden velocity changes in angle axes A, B may be more strongly rounded than sudden velocity changes in linear axes X, Y, Z. For instance, to this end, the velocity profile of angle axes A, B is smoothed (filtered) via other, e.g., softer, filters than the velocity profile of linear axes X, Y, Z. This may be accomplished via a different parameterization of one filter type (e.g., low-pass filter) or via different filter types (e.g., hard low-pass filter for linear axes X, Y, Z and soft delta filter for angle axes A, B).

In FIG. 4b, curve 32 represents the velocity profile of angle axis B after a suitably softer filtering. One may see that smaller accelerations occur than for a synchronous velocity control according to curve 31. The surface quality of workpiece 3 may be improved, since better path fidelity results due to the lower acceleration occurring when working with the separate velocity control in angle axes A, B. Namely, angle axis B is better able to adhere to a setpoint path according to curve 32 than a setpoint path according to curve 31.

However, velocity may also be increased by taking advantage of the fact that angle axes A, B now have an "acceleration reserve." If the predefined path velocity is increased on the whole, it may be that angle axes A, B come closer again to their limit, but altogether, all axes X, Y, Z, A, B now reach end point 11 more quickly from starting point 10. The programmer of a parts program may utilize either of the two effects. One possibility for influencing the effect of the separate velocity control in one or the other direction is to specify the degree of rounding of a velocity profile separately for linear axes X, Y, Z and angle axes A, B, by, for example, appropriately setting the filter parameters. Tolerances which establish a maximum deviation from linear movement 20 and angular movement 21, respectively, specified by the programmer, may thus be predefined separately for the filter for linear axes X, Y, Z and the filter for angle axes A, B. The greater this tolerance is specified to be, the softer the respective filter behaves and the more significantly the respective velocity profile is rounded.

In an exemplary method of the present invention for continuous-path control using separate velocity control, despite the fact that the movement between linear axes X, Y, Z and angle axes A, B may no longer be synchronous, the engagement point of tool 2 on workpiece 3 remains unchanged, that is to say, remains on the path originally predefined by the programmer. Thus the dimensional accuracy of the workpiece does not change. The difference between curve 31 (synchronous velocity control) and curve 32 (separate velocity control) discernible in FIG. 4b represents the deviation of angle axis B from the synchronous velocity control. This deviation may therefore be corrected via compensation movements in linear axes X, Y, Z in order to obtain a resulting path of the tip of tool 2 relative to workpiece 3 which corresponds to that of the synchronous velocity control. This may be accomplished by RTCP unit 6.

Only linear axes X, Y, Z may need to be moved in synchronism, while angle axes A, B may be controlled by a separate velocity control. RTCP unit 6 takes into account the positions of tool 2 deviating from the synchronous setpoint positions, and retains the engagement point of tool 2 on workpiece 3 on the setpoint path.

The observations above are made in terms of a limited acceleration in the angle axes. A velocity control is discussed. Limits may also be set for the higher derivatives of the tool path, e.g., for the maximum change in acceleration, thus the jerk. Therefore, not only sudden changes in the velocity, but also kinks may be impossible. A kink in the velocity may therefore also need to be rounded. However, since except for constants, these variables are in each case mutually determined, the observations are also valid for a restriction by the maximum jerk. In this sense, it is then also possible to speak of a synchronous or separate acceleration control.

The movement between tool (2) and workpiece (3) may also be specified by methods other than that described in the example. Thus, in modern numerical controls (5) it is possible to program parts programs with splines or NURBS (non-uniform rational B-spline), by which curved paths may be predefined without sudden changes in the velocity profile or acceleration profile. Here, as well, velocity profiles (or acceleration profiles) may ultimately be predefined, which may be executed according to an exemplary embodiment of the present invention using a separate velocity control for linear axes X, Y, Z and angle axes A, B.

What is claimed is:

1. A method for continuous-path control in at least two linear machine tool axes and at least one angle machine tool axis, comprising:
    predefining movement of a tool relative to a workpiece by a parts program for a numerical control;
    performing a velocity control in the numerical control separately for the linear machine tool axes and the angle machine tool axis by rounding of a velocity profile in the angle machine tool axis more significantly than in the linear machine tool axes; and
    correcting deviations in the movement between the tool and the workpiece resulting due to the separate velocity control by compensation movement of the linear machine tool axes.

2. The method as recited in claim 1, further comprising controlling the compensation movements of the linear machine tool axes by an RTCP unit, the RTCP unit, in response to a given deviation of the angle machine tool axis from a synchronous velocity control of all axes, maintaining an engagement point of the tool on the workpiece constant.

3. The method as recited in claim 1, wherein the rounding includes rounding the velocity profiles in the angle machine tool axis with softer filter than rounding the velocity profiles in the linear machine tool axes.

4. The method as recited in claim 3, wherein the rounding includes rounding the velocity profiles in the angle machine tool axis with delta filters.

5. The method as recited in claim 3, wherein the rounding includes rounding the velocity profiles in the linear machine tool axes with low-pass filters.

6. The method as recited in claim 1, further comprising separately predefining a measure for rounding the velocity profiles for the angle machine tool axis and the velocity profiles for the linear machine tool axes.

7. The method as recited in claim 6, further comprising predefining separate tolerances for rounding the velocity profiles for the angle machine tool axis and the velocity profiles for the linear machine tool axes.

8. The method as recited in claim 6, further comprising predefining different filter parameters for rounding the velocity profiles for the angle machine tool axis and the velocity profiles for the linear machine tool axes.

9. A device for continuous-path control in at least two linear machine tool axes and at least one angle machine tool axis, comprising:
    means for predefining movement of a tool relative to a workpiece by a parts program for a numerical control;
    means for performing a velocity control in the numerical control separately for the linear machine tool axes and the angle machine tool axis, including rounding velocity profiles in the angle machine tool axis more significantly than velocity profiles in the linear machine tool axes; and
    means for correcting deviations in the movement between the tool and the workpiece resulting due to the separate velocity control by compensation movement of the linear machine tool axes.

10. A device for continuous-path control in at least two linear machine tool axes and at least one angle machine tool axis, comprising:
    an arrangement configured to predefine movement of a tool relative to a workpiece by a parts program for a numerical control;
    an arrangement configured to perform a velocity control in the numerical control separately for the linear machine tool axes and the angle machine tool axis, including rounding of velocity profiles in the angle machine tool axis more significantly than velocity profiles in the linear machine tool axes; and
    an arrangement configured to correct deviations in the movement between the tool and the workpiece resulting due to the separate velocity control by compensation movement of the linear machine tool axes.

* * * * *